(12) United States Patent
Oaki et al.

(10) Patent No.: US 8,694,159 B2
(45) Date of Patent: Apr. 8, 2014

(54) ROBOT CONTROL APPARATUS, DISTURBANCE DETERMINATION METHOD, AND ACTUATOR CONTROL METHOD

(75) Inventors: Junji Oaki, Kanagawa-ken (JP); Junichiro Ooga, Kanagawa-ken (JP); Hideki Ogawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 191 days.

(21) Appl. No.: 13/418,475

(22) Filed: Mar. 13, 2012

(65) Prior Publication Data
US 2013/0073085 A1   Mar. 21, 2013

(30) Foreign Application Priority Data

Sep. 21, 2011   (JP) ................... 2011-206651

(51) Int. Cl.
*G05B 19/18*   (2006.01)
(52) U.S. Cl.
USPC ............... 700/253; 700/258; 700/260; 901/9; 901/46
(58) Field of Classification Search
USPC .......... 700/253, 254, 255, 256, 260; 901/2, 9, 901/10, 11, 19, 20, 46, 49; 701/23
See application file for complete search history.

(56) References Cited

U.S. PATENT DOCUMENTS

| 8,155,790 B2 * | 4/2012 | Oga et al. ................. 700/261 |
| 8,428,779 B2 | 4/2013 | Ohga et al. |
| 2004/0158358 A1 * | 8/2004 | Anezaki et al. ............ 700/264 |
| 2010/0286826 A1 * | 11/2010 | Tsusaka et al. ............ 700/254 |
| 2011/0060460 A1 * | 3/2011 | Oga et al. ................. 700/254 |
| 2011/0106311 A1 * | 5/2011 | Nakajima et al. .......... 700/253 |
| 2012/0022690 A1 * | 1/2012 | Ooga et al. ................ 700/258 |

FOREIGN PATENT DOCUMENTS

| JP | 2003-245881 | 9/2003 |
| JP | 2010-105138 | 5/2010 |
| JP | 2011-197050 | 10/2011 |

OTHER PUBLICATIONS

Asakura-Shoten, T. Katayama, "Introduction to System Identification", Japanese Textbook, Chapter 5, 1994.

* cited by examiner

*Primary Examiner* — Khoi Tran
*Assistant Examiner* — Rachid Bendidi
(74) *Attorney, Agent, or Firm* — Amin, Turocy & Watson, LLP

(57) ABSTRACT

A robot control apparatus includes an actuator; a generator unit; a first detection unit; a first computation unit to compute current positional data of the arm; a second computation unit to compute an input value; a third computation unit to compute an estimation value of a driving torque for driving the actuator; a fourth computation unit to compute a difference between the estimation value of the driving torque and a true value of the driving torque; and a second detection unit to detect a disturbance applied to the arm, wherein the second detection unit includes an update unit to estimate a parameter of a time-series model and updating the time-series model of the first sampling period by applying the parameter, and a determination unit to determine whether a disturbance occurs, by comparing the time-series model of the first sampling period with a time-series model of a second sampling period.

19 Claims, 11 Drawing Sheets

ROBOT CONTROL APPARATUS, DISTURBANCE DETERMINATION METHOD, AND ACTUATOR CONTROL METHOD

CROSS-REFERENCE TO RELATED APPLICATIONS

This application is based upon and claims the benefit of priority from the prior Japanese Patent Application No. 2011-206651, filed on Sep. 21, 2011, the entire contents of which are incorporated herein by reference.

FIELD

Embodiments generally relate to a robot control apparatus, a disturbance determination method, and an actuator control method.

BACKGROUND

A collision with an obstacle in the surrounding environments may occur when a robot arm which handle things or the like is operated. In order to stably operate the robot arm even after the collision, it is necessary to detect a collision of the robot arm.

In this regard, a technique has been proposed which estimates an external torque generated by the effect of disturbance caused by a collision of the robot arm and the like and thus determines that the leading end of the robot collides on the basis of the external torque being equal to or greater than a predetermined threshold without using force sensors.

However, due to the effect of a modeling error in the dynamic model of the robot arm, an error is included in the external torque. Therefore, it is difficult to detect the disturbance exerted on the robot arm with high precision.

DETAILED DESCRIPTION

Figure 1:
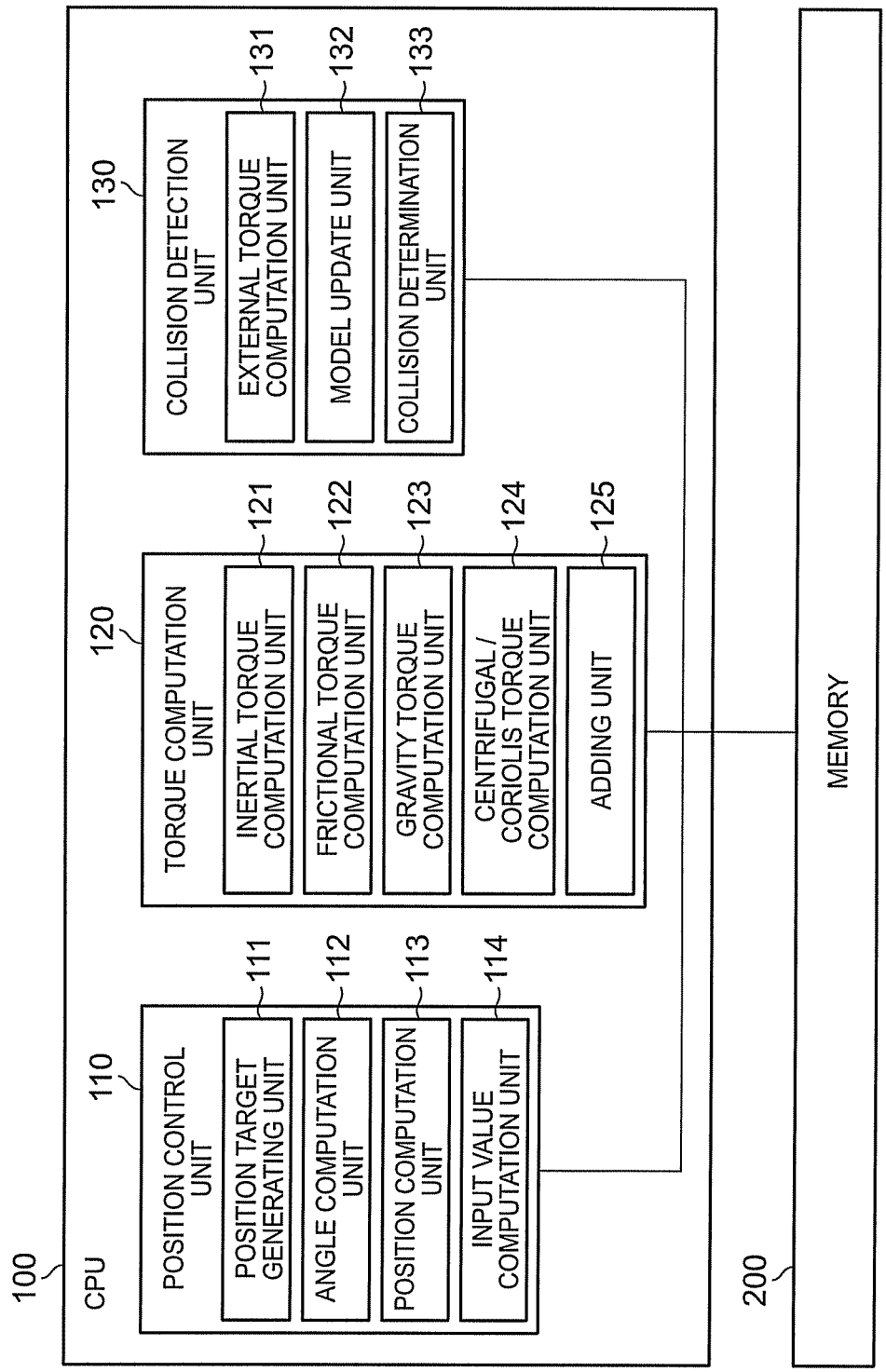
FIG. 1 is a configuration diagram illustrating a robot control apparatus according to a first embodiment.

There are provided a robot control apparatus, a disturbance determination method, and a robot control method capable of detecting a disturbance exerted on a robot arm with high precision.

According to an embodiment, there is provided that a robot control apparatus including an actuator for rotatably driving a driving shaft of an arm; a generator unit configured to generate target positional data of an end of the arm; a first detection unit to detect a rotation angle of the driving shaft at each sampling period; a first computation unit configured to compute current positional data of the end of the arm using the rotation angle; a second computation unit configured to compute an input value relating to the actuator, by using the target positional data and the current positional data; a third computation unit configured to compute an estimation value of a driving torque for driving the actuator using a rotation angle of the driving shaft; a fourth computation unit configured to compute a difference between the estimation value of the driving torque and a true value of the driving torque relating to the input value; and a second detection unit to detect a disturbance applied to the arm, wherein the second detection unit includes an update unit configured to estimate a set of parameter of a time-series model by setting the difference as a variable and updating the time-series model of the first sampling period by applying the set of the parameter, and a determination unit configured to determine whether or not a disturbance occurs in the arm, by comparing the time-series model of the first sampling period with a time-series model of a second sampling period preceding the first sampling period.

According to another embodiment, there is provided that a disturbance determination method in an operational processing unit, including: computing an external force estimated to be applied to a target object by a computation unit; estimating a set of parameter of a time-series model by setting the external force as a variable and updating the time-series model at a first sampling period by applying the parameter by an update unit; and determining whether or not the external force is applied to the target object by comparing the time-series model of the first sampling period and a time-series model of a second sampling period preceding the first sampling period by a determination unit.

According to further embodiment, there is provided that a method of controlling an actuator for rotatably driving a driving shaft of an arm, including: generating target positional data of an end of the arm, by a generator unit; detecting a rotation angle of the driving shaft for every sampling period, by a first detection unit; computing current positional data of the end of the arm using the rotation angle, by a first computation unit; computing an input value for the actuator using the target positional data and the current positional data, by a second computation unit; computing an estimation value of a driving torque for driving the actuator using a rotation angle of the driving shaft, by a third computation unit; computing a difference between an estimation value of the driving torque and a true value of the driving torque relating to the input value, by a fourth computation unit; and estimating a set of parameter of a time-series model by setting the difference as a variable and updating the time-series model of the first sampling period by applying the set of the parameter, by an update unit; and determining whether or not a disturbance occurs in the arm by comparing the time-series model of the first sampling period with a time-series model of a second sampling period preceding the first sampling period by a determination unit.

Hereinafter, embodiments of the invention will be described with reference to the accompanying drawings.

First Embodiment

Figure 12:
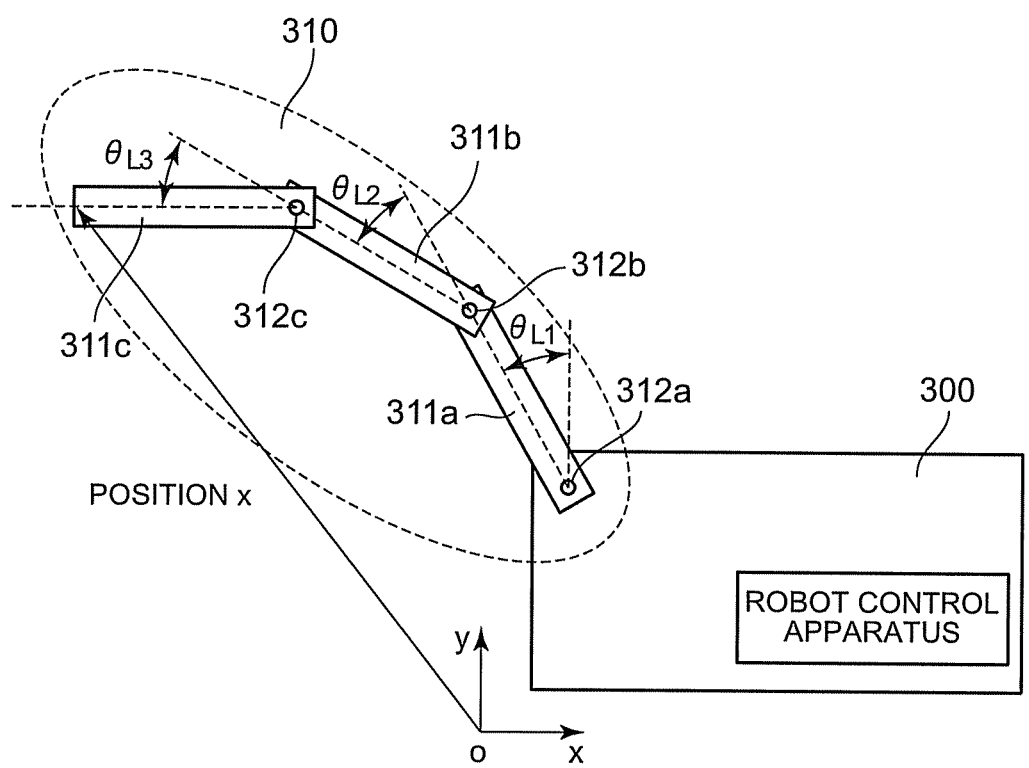
FIG. 12 is a configuration diagram illustrating a robot as an example of the control target.

A robot as an exemplary control target of the present embodiment has a mainframe 300 and an arm 310 installed in the mainframe 300 as illustrated in FIG. 12.

The arm 310 illustrated in FIG. 12 has three links 311 (311*a*, 311*b*, and 311*c*) and three driving shafts 312 (312*a*, 312*b*, and 312*c*) serving as a rotational shaft (joint) to rotate each link 311.

The link 311*a* is rotatably connected to the mainframe 300 through a driving shaft 312*a*. In addition, the links 311*b* and 311*c* are rotatably connected to the links 311*a* and 311*b*, respectively, through the driving shafts 312*b* and 312*c*, respectively.

Figure 13:
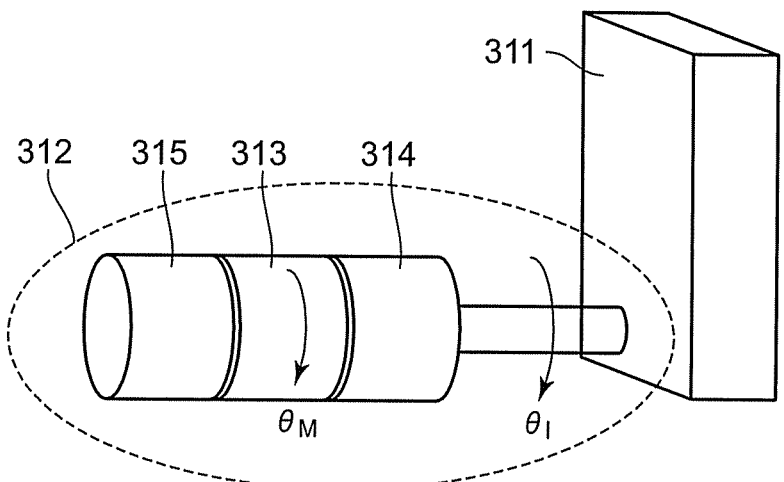
FIG. 13 is a configuration diagram illustrating the robot arm of FIG. 12.

As schematically illustrated in FIG. 13, each link 311 includes a driving shaft 312, a motor 313 serving as an actuator for rotatably driving each driving shaft 312, a reducer 314 for improving a rotational torque of each driving shaft 312 by reducing the rotation number of the motor 313, and an angle detector 315 for detecting a change amount of the rotational angle (hereinafter, referred to as a motor angle $\theta_M$) of the rotational shaft of the motor 313. As the angle detector 315, for example, a sensor such as an encoder may be used.

Referring to FIG. 12, the robot control apparatus for controlling the robot is provided inside of the mainframe 300. The robot control apparatus performs position control of the leading end of the arm 310 (the leading end position of the link c) of the robot along a predetermined track at a normal time.

Figure 14:
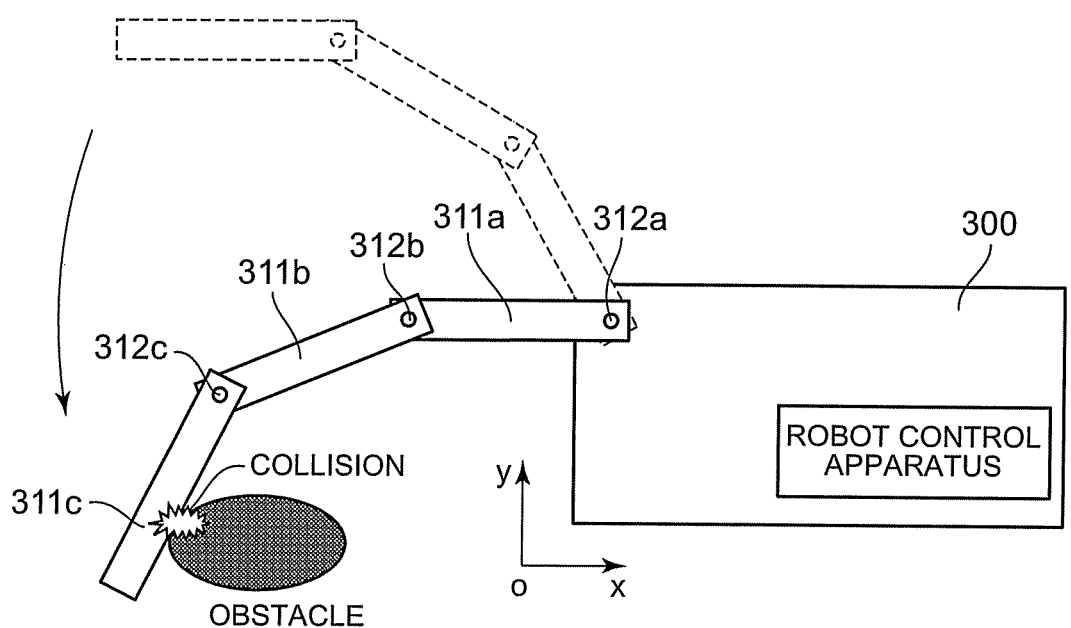
FIG. 14 is a diagram illustrating a state that the arm collision occurs.

The robot control apparatus detects a collision caused by a disturbance with high precision when the disturbance is applied to the arm 310, for example, when the arm 310 collides with an obstacle and the like as illustrated in FIG. 14, and performs positional control of the leading end of the arm 310 using the detection result.

FIG. 1 is a configuration diagram illustrating the robot control apparatus according to a first embodiment of the invention.

The robot control apparatus according to the first embodiment of the invention has a central processing unit (CPU) 100 and a storage device (memory) 200 as illustrated in FIG. 1.

The CPU 100 of FIG. 1 has three modules. Specifically, the CPU 100 includes a positional control unit 110 for controlling a position of the leading end of the arm 310, a torque computation unit 120 for computing an estimation value of the torque of the driving shaft 312 in each link 311, and a collision detection unit 130 for totally detecting a collision between the arm 310 and the obstacle in any one of links 311 of the arm 310.

The position control unit 110 controls the motor angle $\theta_M$ such that a difference between the target value $X_R$ (hereinafter, referred to as an arm tip position target value) of a 3-dimensional position of the arm leading end (hereinafter, referred to as an arm tip position) generated by the positional target value generating unit 111 described below and the arm leading position X obtained based on the detection value of the motor angle $\theta_M$ of the angle detector 315 becomes zero. The link angle $\theta_L$ is controlled through the reducer 314 by controlling the motor angle $\theta_M$. As a result, the position control unit 110 performs position control for allowing the arm tip position X to follow the arm tip position target value $X_R$ by controlling the link angle $\theta_L$.

The torque computation unit 120 obtains the link angle $\theta_L$ from the position control unit 110 and computes the estimation value (hereinafter, referred to as a torque estimation value) of the torque of the driving shaft 312 in each link 311 based on a dynamic model of the arm 310. In addition, the torque estimation value is an estimation value of the driving torque anticipated to be necessary to drive each motor 313.

The collision detection unit 130 obtains the torque estimation value from the torque computation unit 120 and the link angle $\theta_L$ from the position control unit 110 and computes an external torque generated in each link 311 by the disturbance applied to the arm 310. In addition, the collision detection unit 130 detects a collision in the entire arm 310 using this external torque.

Figure 2:
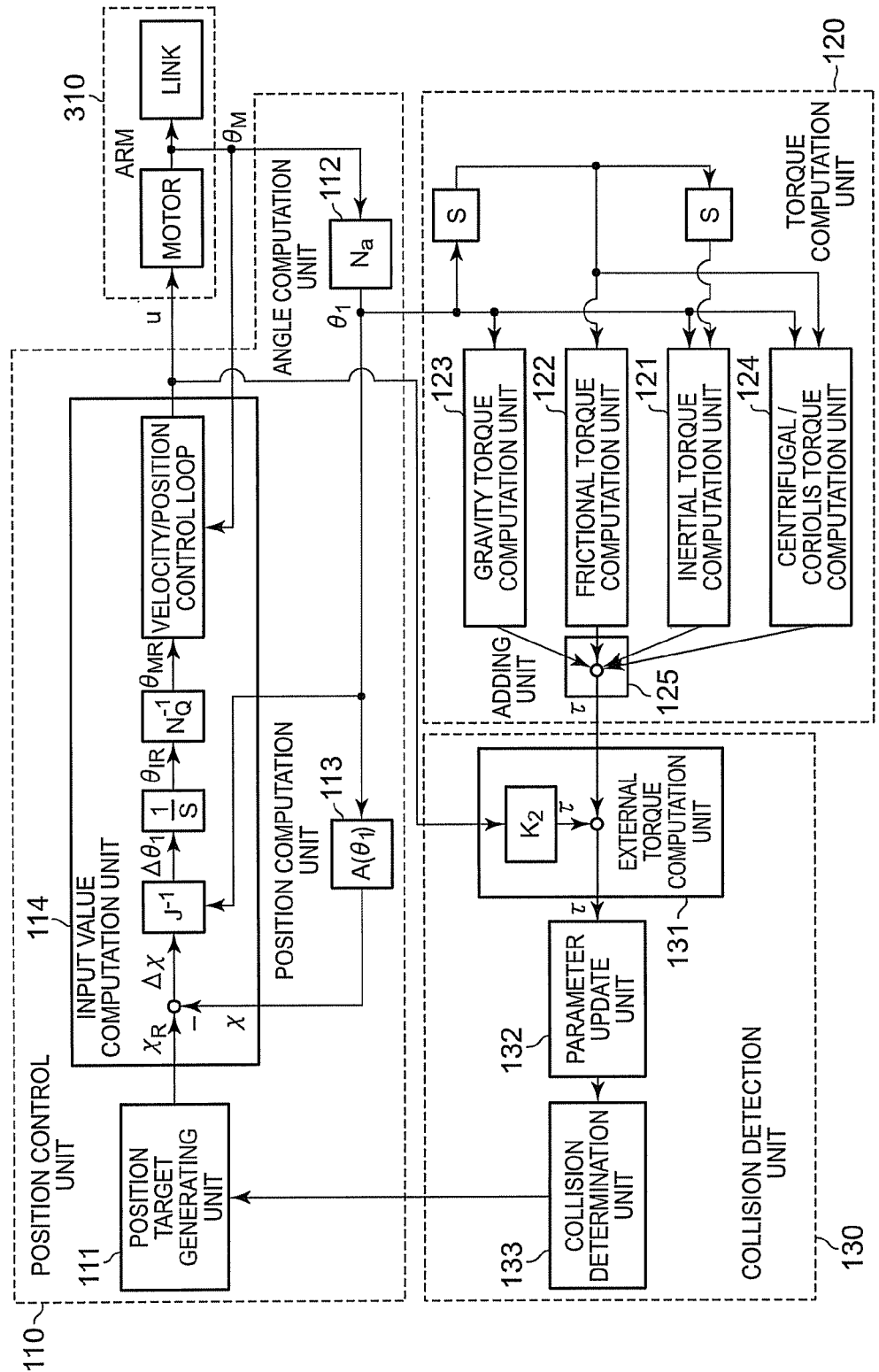
FIG. 2 is a block diagram illustrating operations in the CPU of the robot control apparatus of FIG. 1.

Hereinafter, each module will be described in detail with reference to FIGS. 1 and 2. In the following description, it is assumed that each processing of the modules is performed at every sampling period (control cycle), and the sampling is denoted by k (where, k=0, 1, 2, . . . ).

(Position Control Unit)

As illustrated in FIG. 1, the position control unit 110 includes a position target generating unit 111 for generating the arm tip position target value $X_R$, an angle computation unit 112 for computing the link angle $\theta_L$, a position computation unit 113 for computing the arm tip position X, and an input value computation unit 114 for computing the input value u for each motor 313.

Here, each variable (such as the motor angle $\theta_M$, the link angle $\theta_L$, and the arm tip position x) has the relation as follows.

$$\begin{cases} x = \Lambda(\theta_L) \\ \theta_L = N_G \theta_M \\ x_R = \Lambda(\theta_{LR}) \\ \theta_{LR} = N_G \theta_{MR} \end{cases} \quad [\text{Equation 1}]$$

where, $$\begin{cases} \theta_M = [\theta_{M1}, \ldots, \theta_{Mn}]^\tau : \text{motor angle} \\ \theta_L = [\theta_{L1}, \ldots, \theta_{Ln}]^\tau : \text{link angle} \\ x = [x_1, \ldots, x_n]^\tau : \text{arm tip position} \\ \theta_{MR} = [\theta_{MR1}, \ldots, \theta_{MRn}]^\tau : \text{motor angle target value} \\ \theta_{LR} = [\theta_{LR1}, \ldots, \theta_{LRn}]^\tau : \text{link angle target value} \\ x_R = [x_{R1}, \ldots, x_{Rn}]^\tau : \text{arm tip position target value, and} \\ N_G = \text{diag}(n_{G1}, \ldots, n_{Gn}) : \text{reduction ratio of reducer} \begin{pmatrix} \text{each factor is equal} \\ \text{to or smaller than 1} \end{pmatrix} \end{cases}$$

Here, n denotes the number of the driving shafts 312 (set to 3 in the present embodiment) of the arm 311. In addition, Λ denotes a nonlinear function based on the direct kinematics which performs coordinate change for computing the arm tip position x from the link angle $\theta_L$.

The position target generating unit 111 obtains a history of the arm tip position target value from the start of the handling operation to the termination, for example, stored in the memory 200 in advance, and generates a value of the current time as an arm tip position target value $X_R$.

The input value computation unit 114 obtains the arm tip position x from the position control unit 113 described below and the arm tip position target value $X_R$ from the position target generating unit 111 and computes the input value u for controlling the motor angle $\theta_M$ such that a difference between the arm tip position target value $X_R$ and each arm tip position x becomes zero.

Hereinafter, a processing of the input value computation unit 119 will be described in detail with reference to FIG. 2.

The input value computation unit 114 computes a minor change Δx of the arm tip position using the arm tip position target value $X_R$ and the arm tip position x as follows.

$$\Delta x = x_R - x \qquad \text{[Equation 2]}$$

Here, the n×n Jacobian matrix $J(\theta_L)$ obtained by partially differentiating $\Lambda(\theta_L)$ which indicates a relation between a minor change Δx of the arm tip position and a minor change $\Delta\theta_L$ of the link angle is defined as follows.

$$\Delta x = J(\theta_L)\Delta\theta_L \qquad \text{[Equation 3]}$$

In this case, a relation between the minor change Δx of the arm tip position and the minor change $\Delta\theta_L$ of the link angle is established by using the inverse Jacobian matrix which is an inverse matrix of the Jacobian matrix as follows.

$$\Delta\theta_L = J(\theta_L)^{-1}\Delta x \qquad \text{[Equation 4]}$$

That is, since the minor change value of the target link angle can be computed using the aforementioned equation, the link angle target value $\theta L_R$ is obtained by integrating the minor change amount as follows.

$$\theta_{LR} = \int \Delta\theta_L \, dt \qquad \text{[Equation 5]}$$

In this regard, the input value computation unit 114 computes the inverse Jacobian matrix using the link angle $\theta_L$ computed by the angle computation unit 112 described below. In addition, the minor change $\theta_L$ of the link angle is computed using the minor change Δx of the arm tip position and the inverse Jacobian matrix as follows.

$$\Delta\theta_L = J(\theta_L)^{-1}(x_R - x) \qquad \text{[Equation 6]}$$

In addition, the link angle target value $\theta_{LR}$ is computed by integrating the minor change $\Delta\theta_L$ of the link angle described above based on Equation 5.

In addition, the input value computation unit 114 computes the motor angle target value $\theta_{MR}$ by dividing the link angle target value $\theta_{LR}$ by the reduction ratio $N_G$. In addition, the input value (current value) u for driving each motor 313 is computed by applying a velocity/position control law known in the art and using the motor angle target value $\theta_{MR}$ as an input.

The input value computation unit 114 drives the motor 313 and controls the motor angle $\theta_M$ by setting the input value u described above in the motor 313. In this case, the angle detector 315 detects the motor angle $\theta_M$ caused by the driving.

The angle computation unit 112 computes the link angle $\theta_L$ using the motor angle $\theta_M$ detected by the angle detector 315 as follows.

$$\theta_L = N_G \theta_M \qquad \text{[Equation 7]}$$

The position control unit 113 obtains a nonlinear function Λ stored in the memory 200 and computes the arm tip position x at the current time using the link angle $\theta_L$ computed by the angle computation unit 112 as follows.

$$x = \Lambda(\theta_L) \qquad \text{[Equation 8]}$$

As described above, the arm tip position x computed by the position control unit 113 is input to the input value computation unit 114 as a feedback signal.

As indicated in Equation 8, since the link angle $\theta_L$ is necessary to compute the arm tip position x, the angle detector 315 may directly detect the link angle $\theta_L$. In addition, a configuration without using the reducer 314 may be envisaged. Similarly, in this case, since the motor angle $\theta_M$ and the link angle $\theta_L$ are equal to each other, it is apparent that the angle computation unit 112 is not necessary.

(Torque Computation Unit)

As illustrated in FIG. 1, the torque computation unit 120 includes the inertial torque computation unit 121 for computing the inertial torque, the frictional torque computation unit 122 for computing the frictional torque, the gravity torque computation unit 123 for computing the gravity torque, the centrifugal/coriolis torque computation unit 124 for computing the centrifugal/coriolis torque, and the adding unit 125.

Here, generally, a dynamic model of the robot arm is given by the motion equation as follows.

$$M(\theta_L)\ddot{\theta}_L + c(\dot{\theta}_L, \theta_L) + f(\dot{\theta}_L) + g(\theta_L) = \tau \qquad \text{[Equation 9]}$$

where,
$M(\theta_L) \in R^{n \times n}$: inertial matrix
$M(\theta_L)\ddot{\theta}_L \in R^{n \times 1}$: inertial torque
$c(\dot{\theta}_L, \theta_L) \in R^{n \times 1}$: centrifugal/coriolis torque
$f(\dot{\theta}_L) \in R^{n \times 1}$: frictional torque
$g(\theta_L) \in R^{n \times 1}$: gravity torque, and
$\tau \in R^{n \times 1}$: driving torque.

Therefore, if a link angular velocity is obtained by differentiating a detection value of the link angle $\theta_L$ one time, and the angular acceleration is obtained by differentiating the detection value two times, the estimation value of the torque caused by the gravity, the inertial force, the frictional force, the centrifugal force/Coriolis force, and the like can be computed using a physical parameter such as center positions of each link, an inertial moment, and a frictional coefficient.

In addition, the link angular velocity can be computed (as a first derivative) by differentiating two values of the link angle $\theta_L$ obtained as time-series data at different sampling periods and the like. In addition, the link angular acceleration can be computed (as a second derivative) by differentiating values of two link angular velocities obtained at different sampling periods.

The inertial torque computation unit 121, the frictional torque computation unit 122, the gravity torque computation unit 123, and the centrifugal/coriolis torque computation unit 124 compute the inertial torque, the frictional torque, the gravity torque, the centrifugal/coriolis torque, respectively, using physical parameters stored in the memory 200 in advance and the link angle computed by the angle computation unit 112.

The adding unit 125 computes the torque estimation value of each driving shaft 320 as follows (hereinafter, the estimation value is indicated by adding a hat to the variable)

$$\hat{\tau} = \hat{M}(\theta_L)\ddot{\theta}_L + \hat{c}(\dot{\theta}_L, \theta_L)\hat{f}(\dot{\theta}_L) + \hat{g}(\theta_L) \qquad \text{[Equation 10]}$$

Although consideration is made for the inertial torque, the frictional torque, the gravity torque, and the centrifugal/coriolis torque in the present embodiment, the torque caused by the centrifugal force/Coriolis force is sufficiently smaller (about 1/10) than other torques, and thus, the torque caused by the centrifugal force/Coriolis force may not be considered. In this case, the adding unit 125 computes the torque estimation value of each driving shaft 320 by summing the inertial torque, the frictional torque, and the gravity torque.

(Collision Detection Unit)

As illustrated in FIG. 1, the collision detection unit 130 includes the external torque computation unit 131 for computing an external torque added from the outside to the arm 310, the model update unit 132 for updating a model by estimating the parameter of the time-series model, and the collision determination unit 133 for determining the collision using the updated model.

Here, the external torque $\tau_d$ is given by differentiating the torque estimation value and a true value of the driving torque as follows.

$$\hat{\tau}_d = \hat{\tau} - \tau \quad \text{[Equation 11]}$$

In addition, the true value of the driving torque in the aforementioned equation is obtained by multiplying the input value u in the motor 313 by a torque constant $K_t$ obtained from an index value of the motor 313 and stored in the memory 200 in advance.

The external torque will become zero in an ideal state without an modeling error, and disturbance. Therefore, if the external torque is not zero, it can be estimated that a disturbance is applied to the arm 310. Therefore, this external torque can be used to detect a collision.

However, the dynamic model of Equation 9 contains a modeling error caused by a physical parameter such as an inertial moment or a frictional coefficient. In addition, since there is also an effect of the elastic force torque caused by a mechanical resonance which is not considered in the dynamic model of Equation 9 and the like, although the collision can be detected during the low-velocity operation, it may be difficult to distinguish between the torque variation necessary in the acceleration/deceleration and the torque variation caused by a collision during the high-velocity operation.

In this regard, according to the present embodiment, in order to absorb such a modeling error, an automatic regressive (AR) model indicated as the following equation is applied by assuming that the external torque of Equation 11 is a first-dimensional time-series signal y(k) (where, k=0, 1, 2, ... ) in each driving shaft 312.

$$y(k) = -a_1 y(k-1) - \ldots a_{n_a} y(k-n_a) + e(k) \quad \text{[Equation 12]}$$

In the AR model of the aforementioned equation, the time-series signal y(k) is indicated by a linear combination of the time-series signals corresponding to past $n_a$ steps. Here, $a_1$ to $a_{n_a}$ denote AR parameters, and e(k) denotes a residual.

In addition, the AR model of Equation 12 can be defined as:

$$\alpha = [a_1, \ldots, a_{n_a}]^\tau$$

$$\varphi(k) = [-y(k-1), \ldots, -y(k-n_a)]^\tau$$

$$y(k) = \alpha^\tau \varphi(k) + e(k) \quad \text{[Equation 13]}$$

where, the AR parameter α denotes a coefficient for characterizing the AR model. The AR model can be computed by appropriately estimating the AR parameter to minimize the residual e(k).

The estimation value of the AR parameter α can be computed while it is updated in real-time if an iterative least square technique is employed along with a forgetting factors λ (typically, selected from a range between 0.97 and 0.995) as follows.

$$\begin{cases} \hat{\alpha}(k) = \hat{\alpha}(k-1) + k_\alpha \varepsilon(k) \\ \varepsilon(k) = y(k) - \varphi^\tau(k)\hat{\alpha}(k-1) \\ k_\alpha = \dfrac{P(k-1)\varphi(k)}{\lambda + \varphi^\tau(k)P(k-1)\varphi(k)} \\ P(k) = \dfrac{1}{\lambda}[P(k-1) - k_\alpha \varphi^\tau(k)P(k-1)] \end{cases} \quad \text{[Equation 14]}$$

where, ε(k) denotes a prediction error, kα denotes a gain, and P(k) denotes a covariance matrix.

The external torque computation unit 131 computes the external torque using the torque estimation value computed by the torque computation unit 120 and a driving torque obtained by multiplying the input value u computed by the input value computation unit 114 by a torque constant $K_t$ as follows. This external torque may be considered as an external force estimated to be applied from an outer side to the arm 310.

$$\hat{\tau}_d = \hat{\tau} - K_t u \quad \text{[Equation 15]}$$

The model update unit 132 applies the external torque computed by the external torque computation unit 131 as a variable to the AR model indicated by Equation 12. In addition, the AR model is updated by successively estimating the estimation values for all of the AR parameters using the iterative least square technique as indicated in Equation 14.

As will be described in detail below, the collision determination unit 133 determines whether or not there is a collision of the arm 310 based on the AR model successively updated by the model update unit 132.

Hereinafter, the operation of the collision determination unit 133 will be described with reference to FIGS. 3 to 8.

Embodiment 1

As a first method for determining the collision using the collision determination unit 133, a method of using a time change of the successively estimated AR parameter will be described.

Figure 3A:
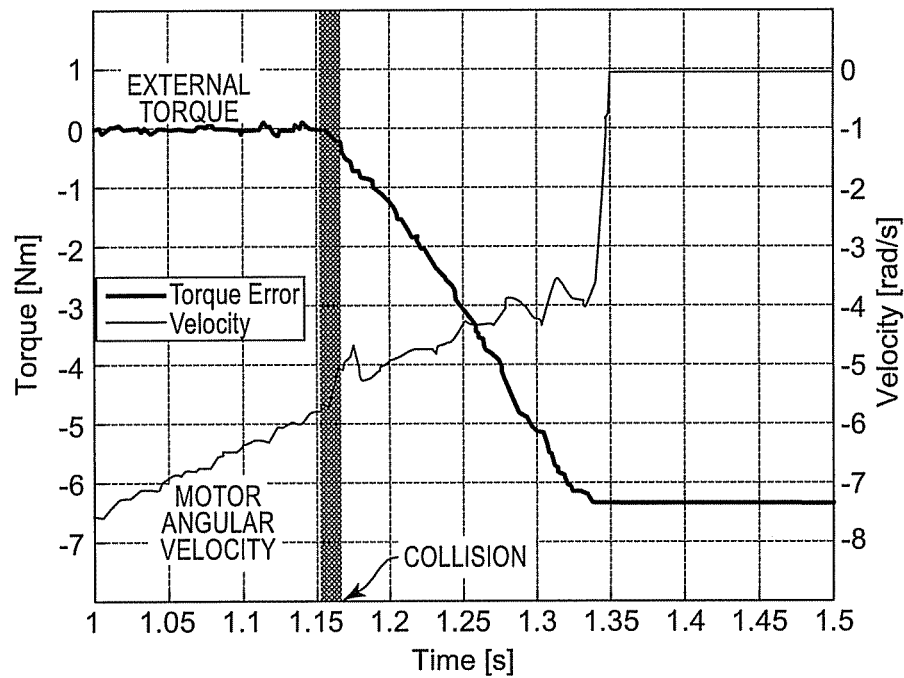
FIGS. 3A and 3B are explanatory diagrams illustrating Embodiment 1.
Figure 3B:
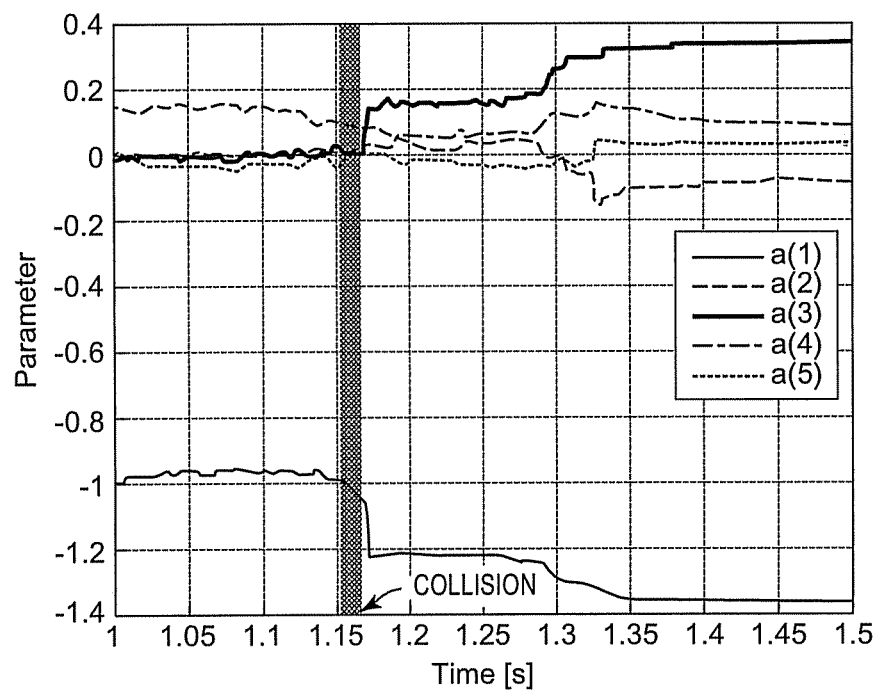

FIG. 3A illustrates an exemplary time response of the motor angular velocity and the external torque when the arm 310 collides, and FIG. 3B illustrates an exemplary time response of the successively updated AR model parameter.

Here, a fifth-order AR model is used, and five AR parameters are shown in this example. The legends a(1) to a(5) in the drawing are related to $a_1$ to $a_5$. In FIG. 3B, although a collision occurs at about 1.16 [s], the lowest-order AR parameter $a_1$ is most significantly changed, and the parameter $a_3$ is secondly significantly changed.

On the contrary, since the external torque illustrated in FIG. 3A is slowly changed, it is evident that the method of detecting the change of the AR parameter is better for detecting collision. Here, a fact that the motor angular velocity does not directly become zero even when a collision occurs indicates that the joint shaft is bent.

The collision determination unit 133 computes the change amount of the lowest-order AR parameter $a_1$ illustrated in FIG. 3, which is most significantly changed, based on a difference between the estimation value of the parameter at the current sampling period k and the estimation value of the parameter at the immediately previous sampling period (k−1).

In addition, in a case where an absolute value of the change amount of the lowest-order AR parameter exceeds a predefined threshold (for example, 0.1) stored in the memory 200 in several driving shafts 312, it is determined that a collision occurs in the arm 310.

In addition, according to the iterative least square technique, it is possible to adjust the change amount of the AR parameter by adjusting the forgetting factor $\lambda$. The forgetting factor may be set to a greater value such as 0.99 when the operational acceleration of the robot is small, and may be set to a smaller value such as 0.98 when the acceleration is large so that it is possible to increase collision determination accuracy by variably setting the forgetting factor.

In addition, instead of the lowest-order AR parameter of the present embodiment, other AR parameters may be used to determine a collision.

Embodiment 2

As a second method of determining a collision using the collision determination unit 132, a method of using a temporal change of the prediction error based on multistage prediction will be described.

In the AR model of Equation 12, if a number of iterations k are performed by successively estimating the AR parameter, a sampling time delay generated in the digital processing is obtained, and thus, multistage prediction can be performed. First, a one-stage prediction value is defined as follow:

$$\hat{y}(k) = \alpha^T \phi(k) \qquad \text{[Equation 16]}$$

In addition, two-stage and three-stage prediction values are defined as follows:

$$\hat{y}(k+1) = -a_1 \hat{y}(k) - a_2 y(k-1) - \ldots - a_{n_a} y(k-n_a+1)$$

$$\hat{y}(k+2) = -a_1 \hat{y}(k+1) - a_2 \hat{y}(k) - \ldots - a_{n_a} y(k-n_a+2) \qquad \text{[Equation 17]}$$

Therefore, the one-stage prediction error is given as follows:

$$e_1(k) = \hat{y}(k) - \alpha^T \phi(k) \qquad \text{[Equation 18]}$$

In addition, the two-stage and three-stage prediction errors are given as follows:

$$e_2(k) = \hat{y}(k+1) + a_1 \hat{y}(k) + a_2 y(k-1) + \ldots + a_{n_a} y(k-n_a+1)$$

$$e_3(k) = \hat{y}(k+2) + a_1 \hat{y}(k+1) + a_2 \hat{y}(k) + \ldots + a_{n_a} y(k-n_a+2) \qquad \text{[Equation 19]}$$

Figure 4:
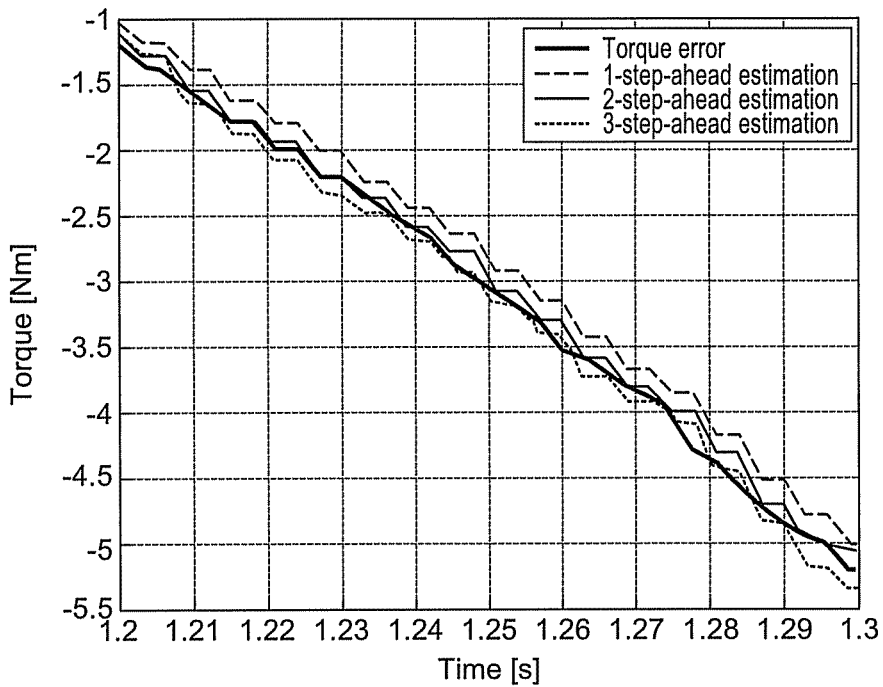
FIG. 4 is an explanatory diagram illustrating Embodiment 2.

In FIG. 4, the external torque and each time response of the one-stage, two-stage, and three-stage prediction errors are compared. Referring to FIG. 4, it is recognized that the one-stage prediction value is slightly delayed from the external torque. Meanwhile, the two-stage prediction value slightly precedes, and the three-stage prediction value apparently precedes.

Figure 5:
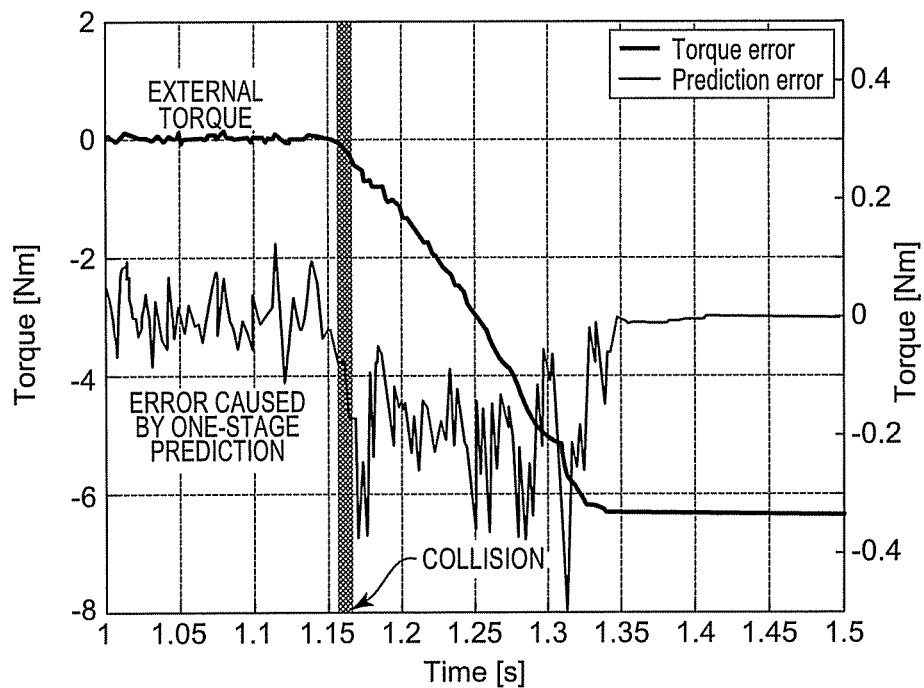
FIG. 5 illustrates a time response of the prediction error generated in one-step prediction.
Figure 6:
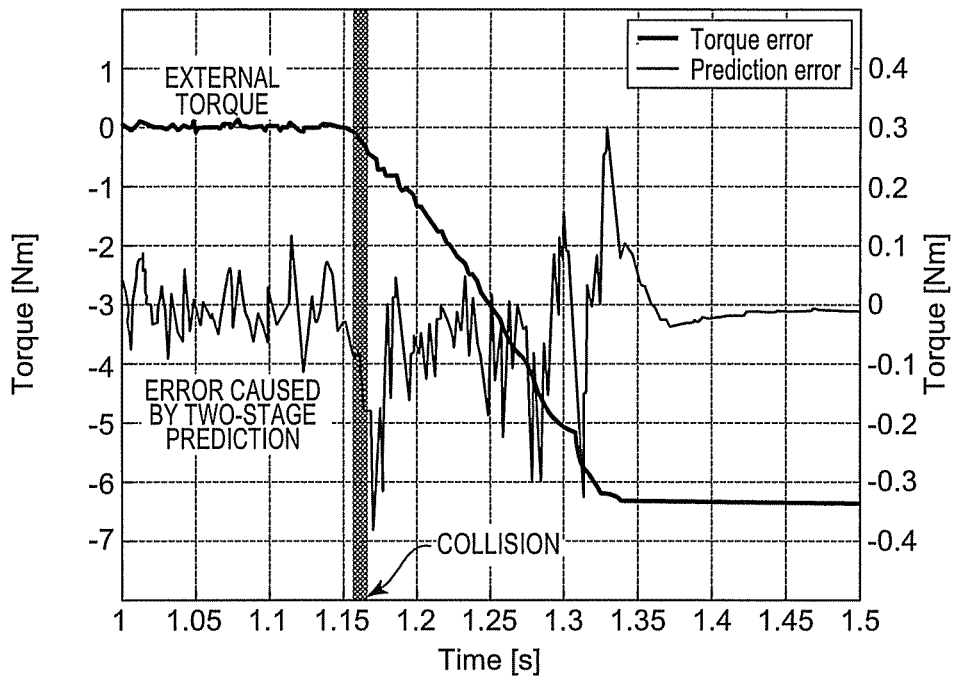
FIG. 6 illustrates a time response of the prediction error generated in two-step prediction.

FIG. 5 illustrates how to detect a collision based on the temporal change of the one-stage prediction error. FIG. 6 illustrates a case of the two-stage prediction error, and FIG. 7 illustrates a case of the three-stage prediction error.

Figure 7:
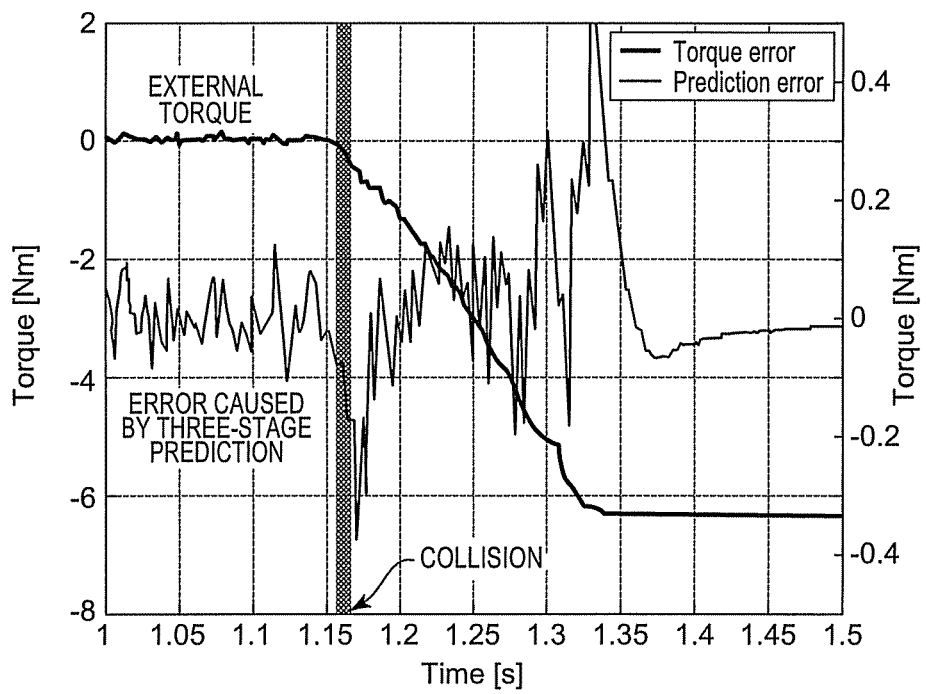
FIG. 7 illustrates a time response of the prediction error generated in three-step prediction.

Comparing FIGS. 5, 6, and 7, although a collision can be detected in each case, a range of the waveform of the time response of the prediction error in FIG. 6 is relatively small, and a threshold can be easily set in FIG. 6. As a result, it is preferable that two-stage prediction error be used to detect a collision in the arm 310.

The collision determination unit 133 computes the error $e_2(k)$ as indicated in Equation 19. In addition, a change amount of the error $e_2(k)$ is computed based on a difference between the error in the current sampling period k and the error in the previous sampling period (k−1).

In addition, in a case where an absolute value of the change amount of the aforementioned error exceeds a predefined threshold, it is determined that a collision occurs in the arm 310.

Embodiment 3

As a third method for detecting a collision using the collision determination unit 133, a method of using a temporal change of the frequency response that can be computed from the AR model will be described.

If Z-transform is made for the AR model of Equation 12 as follows, $$(1 + a_1 z^{-1} + \ldots + a_{n_a} z^{-n_a}) y(k) = e(k)$$

$$A(z^{-1}) y(k) = e(k)$$

where, $$A(z^{-1}) = 1 + a_1 z^{-1} + \ldots + a_{n_a} z^{-n_a} \qquad \text{[Equation 20]}$$

the frequency response of the transfer function $H(z^{-1}) = 1/A(z^{-1})$ of the AR model can be obtained by incorporating the following equation into Equation 20.

$$z^{-1} = e^{j\omega} \qquad \text{[Equation 21]}$$

In Equations 20 and 21, z denotes a Z-transform operator, $\omega$ denotes a frequency, and j denotes an imaginary part.

Figure 8:
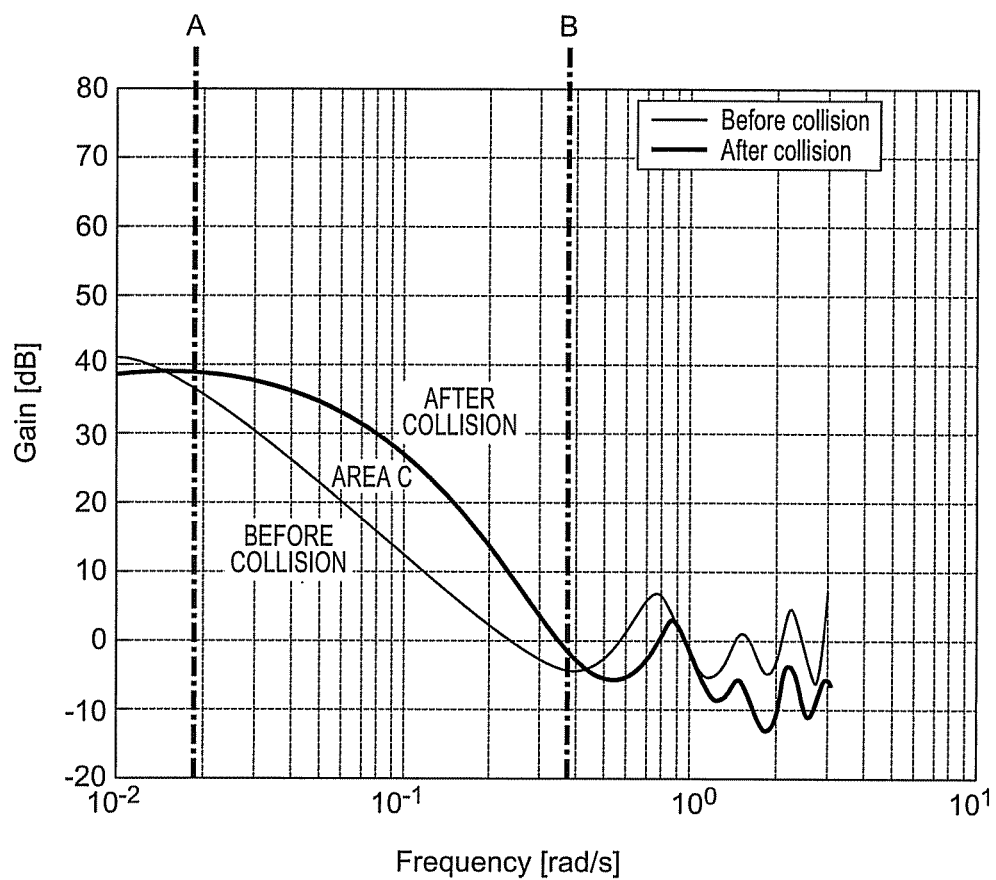
FIG. 8 is an explanatory diagram illustrating Embodiment 3.

FIG. 8 illustrates how to detect a collision using a fact that the frequency response that can be computed from the AR model is changed before and after the collision. It is apparent that a collision can also be detected from the change of the frequency response by assuming that the frictional coefficient or the inertial moment is changed by a collision as described above.

In FIG. 8, in the higher frequency range above the one-dotted chain line B, a mechanical resonance characteristic that has not been considered in the dynamic model of Equation 9 is detected, and thus, the collision detection becomes difficult.

In this regard, if a frequency range where a significant change occurs in the event of a collision is investigated in advance, and a window processing is performed, for example, by integrating a gain difference in the frequency range between the one-dotted chain lines A and B of FIG. 8 for every sampling period, it is possible to facilitate setting of the threshold for detecting a collision.

The collision determination unit 132 computes a frequency response at each sampling period. In addition, a difference between a gain in the current sampling period k and a gain in the previous sampling period (k−1) is computed for every frequency within a predefined window range, and an integral value corresponding to the area C of FIG. 8 is computed by integrating the gain difference with respect to a frequency.

If the absolute value of the integral value exceeds the predefined threshold, it is determined that a collision occurs in the arm 310.

In addition, according to the present example, the frequency response is computed using all of five AR parameters. Therefore, the computation amount increases compared to the method of detecting a collision based on the temporal change of individual AR parameters as in Embodiment 1. However, it is possible to detect a collision more robustly.

Hereinbefore, three methods of determining a collision have been described through Embodiments 1 to 3. These three methods may be individually applied or simultaneously applied. If three methods are simultaneously applied, and a majority decision is made, it is possible to more accurately determine a collision from each link 311.

In addition, the position target generating unit 111 of the position control unit 110 newly generates an arm tip position target value when the collision determination unit 132 determines the collision of the arm 310.

Specifically, when a collision is detected, an arm tip position target value for abruptly stopping the arm 310 is newly generated. In addition, in a case where a new operational instruction is necessary after the collision, for example, in a case where an inverted operation is necessary, the arm tip position target value may be generated to operate the arm 310 in a direction opposite to the collision direction.

Although the AR model is used as a time-series model according to the present embodiment, the invention is not limited to the AR model. Any time-series model may be used if the time-series signals are related using a parameter at each sampling period. In addition, the parameter estimation is not limited to the iterative least square technique.

Although description of the present embodiment has been made for an arm in which the link is rotated with respect to the rotational shaft (joint), the invention may be similarly applied to a translating target. A disturbance applied to the target may be detected through a similar method, for example, using a displacement of the target instead of the link angle.

(First Modification)

Hereinafter, a first modification of the robot control apparatus according to the first embodiment will be described with reference to FIG. 9. Here, like reference numerals denote like elements as in FIG. 1, and description thereof will not be repeated.

Figure 9:
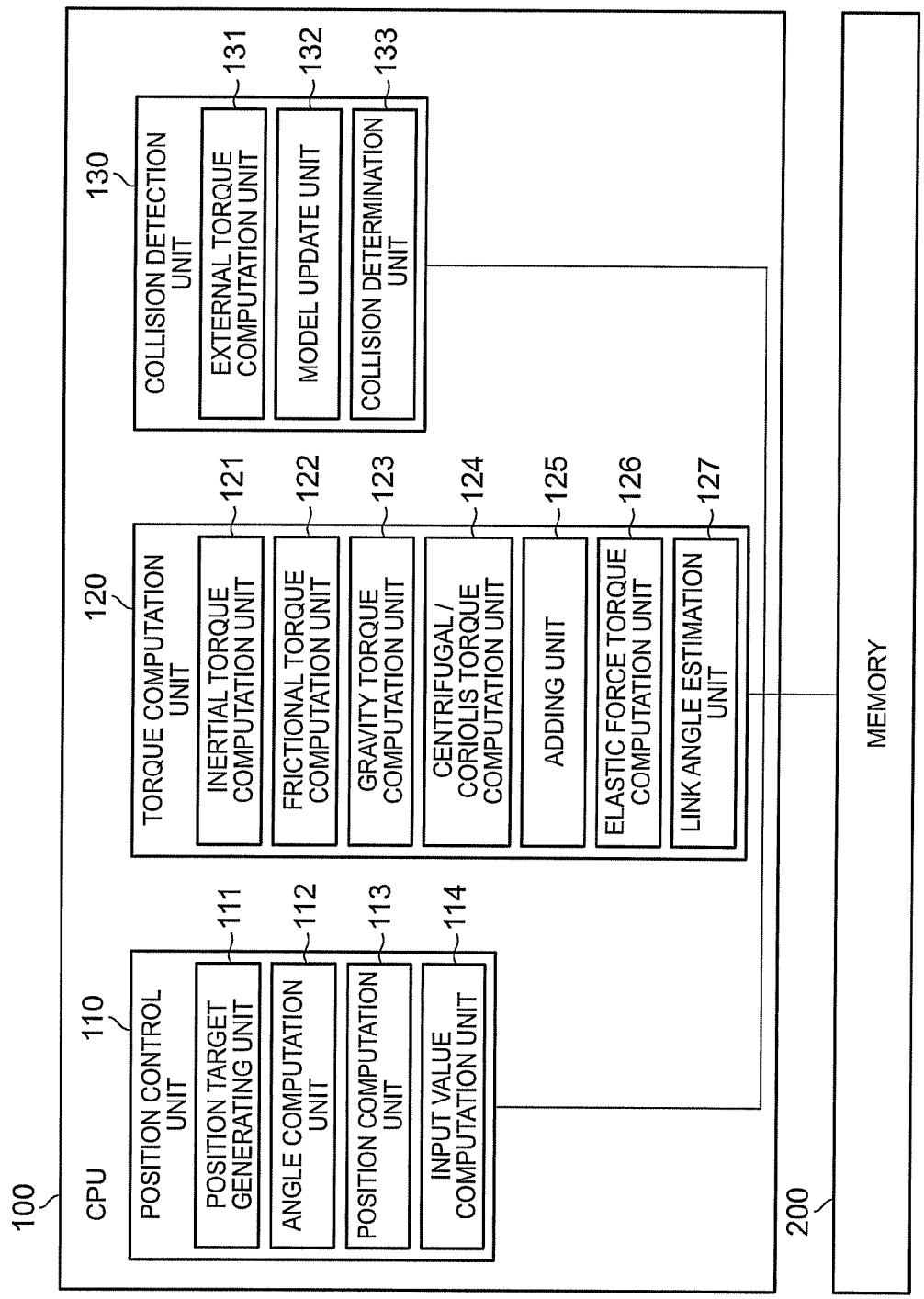
FIG. 9 is a configuration diagram illustrating a robot control apparatus according to a first modification of the first embodiment.

FIG. 9 is a system diagram of the CPU 100 used in the robot control apparatus according to the first modification. In the present modification, the torque computation unit 120 computes the torque estimation value of each driving shaft 312 based on a dynamic model of the arm 310 indicated in Equation 9 in detail.

Although Equation 9 is based on a rigid joint model, an elastic joint model may be used instead, in which the reducer 314 is considered as a low-rigidity spring element. In this case, it is possible to reflect a mechanical resonance generated at the time of acceleration/deceleration on the dynamic model, and it is possible to improve a resolution of determination for the torque variation caused by the collision and the torque variation caused by the acceleration/deceleration.

A motion equation indicating the dynamic model based on an elastic joint model corresponding to Equation 9 based on the rigid joint model is given as follows.

$$M_M \ddot{\theta}_M = \tau - N_G K_G (N_G \theta_M - \theta_L)$$

$$M_M(\theta_L)\ddot{\theta}_M + c(\dot{\theta}_L,\theta_L) + f(\dot{\theta}_L) + g(\theta_L) = K_G(N_G\theta_M - \theta_L)$$ [Equation 22]

where,
$M_M \in R^{n \times n}$: inertial moment of motor
$M_M \ddot{\theta}_M \in R^{n \times 1}$: inertial torque of motor
$\tau \in R^{n \times 1}$: driving torque
$K_G \in R^{n \times n}$: spring coefficient of reducer
$N_G \in R^{n \times n}$: reduction ratio of reducer
$N_G K_G (N_G \theta_M - \theta_L) \in R^{n \times 1}$: elastic force torque caused by torsion of reducer (reaction to motor)
$M_L(\theta_L) \in R^{n \times n}$: inertial matrix of link
$M_L(\theta_L) \ddot{\theta}_L \in R^{n \times 1}$: inertial torque of link
$c(\dot{\theta}_L,\theta_L) \in R^{n \times 1}$: centrifugal/coriolis torque
$f(\dot{\theta}_L) \in R^{n \times 1}$: frictional torque
$g(\theta_L) \in R^{n \times 1}$: gravity torque, and
$K_G(N_G \theta_M - \theta_L) \in R^{n \times 1}$: elastic force torque caused by torsion of reducer In the rigid joint model, the link angle $\theta_L$ can be computed by multiplying the motor angle $\theta_M$ by a reduction ratio. However, in an elastic joint model, the link angle $\theta_L$ is to be estimated from the motor angle $\theta_M$ considering the dynamic model of Equation 22. Therefore, it is necessary to compute the torque estimation value while the link angle $\theta_L$ is estimated from the motor angle $\theta_M$.

For this purpose, Equation 22 is modified to obtain an angular acceleration as follows:

$$\ddot{\theta}_M = M_M^{-1}[\tau - N_G K_G (N_G \theta_M - \theta_L)]$$

$$\ddot{\theta}_L = M_L(\theta_L)^{-1}[-c(\dot{\theta}_L,\theta_L) - f(\dot{\theta}_L) - g(\theta_L) + K_G(N_G\theta_M - \theta_L)]$$ [Equation 23]

The estimation value of the link angle $\theta_L$ can be obtained by setting an initial value of the link angle $\theta_L$ which is not inconsistent with the motor angle $\theta_M$ in Equation 23 and successively iterating integrations while the motor angle $\theta_M$ that can be detected in practice is substituted.

The torque computation unit 120 of FIG. 9 includes the link angle computation unit 127 for successively computing the estimation value of the link angle, the inertial torque computation unit 121 for computing the inertial torque, the frictional torque computation unit 122 for computing the frictional torque, the gravity torque computation unit 123 for computing the gravity torque, the centrifugal/coriolis torque computation unit 124 for computing the centrifugal/coriolis torque, the elastic force torque computation unit 126, and the adding unit 125.

Figure 10:
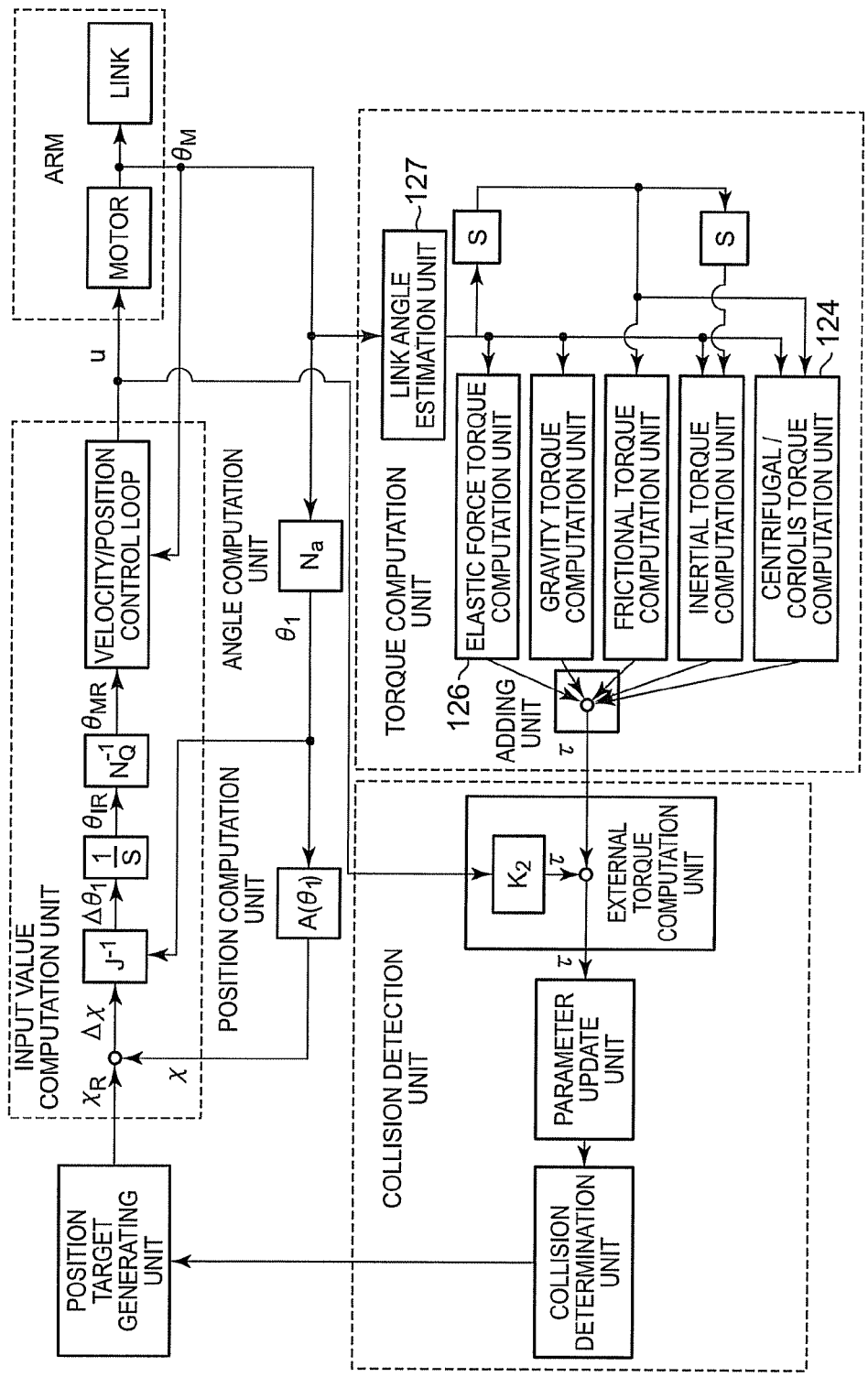
FIG. 10 is a block diagram illustrating operations of the CPU of the robot control apparatus of FIG. 9.

Hereinafter, operations of the torque computation unit 120 will be described in detail with reference to FIG. 10 which illustrates the operation of the CPU 100.

The link angle computation unit 127 computes the estimation value of the link angle by finding a solution of the following differential equation using an initial value of the link angle stored in the memory 200 in advance and the motor angle $\theta_M$ detected by the angle detector 315.

$$\ddot{\theta} = M_L(\theta_L)^{-1}[-c(\dot{\theta}_L,\theta_L) - f(\dot{\theta}_L) - g(\theta_L) + K_G(N_G\theta_M - \theta_L)]$$ [Equation 24]

The inertial torque computation unit 121, the frictional torque computation unit 122, the gravity torque computation unit 123, and the centrifugal/coriolis torque computation unit 124 compute the inertial torque, the frictional torque, the gravity torque, and the centrifugal/coriolis torque, respectively, using the physical parameter stored in the memory 200 in advance and the estimation value of the link angle computed by the link angle computation unit 127.

In addition, the elastic force torque computation unit 126 computes the elastic force torque as follows:

$$h(\theta_M,\theta_L) = K_G(N_G\theta_M - \theta_L)$$ [Equation 25]

The adding unit 125 computes the torque estimation value of each driving shaft 320 using the inertial torque, the frictional torque, the gravity torque, the centrifugal/coriolis torque, and the elastic force torque as follows:

$$\hat{\tau} = \hat{M}(\theta_L)\ddot{\theta}_L + \hat{c}(\dot{\theta}_L,\theta_L) + \hat{f}(\dot{\theta}_L) + \hat{g}(\theta_L) + \hat{h}*\theta_M,\theta_L)$$ [Equation 26]

In addition, since a torsion caused by a spring element of the reducer 314 is insignificant, the values computed by the angle computation unit 112 may be used for the link angle necessary to compute the direct kinematics or a Jacobian matrix as in the first embodiment.

(Second Modification)

Hereinafter, a second modification of the robot control apparatus according to the first embodiment will be described with reference to FIG. 11. In addition, like reference numerals denote like elements as in FIG. 1, and description thereof will not be repeated.

Figure 11:
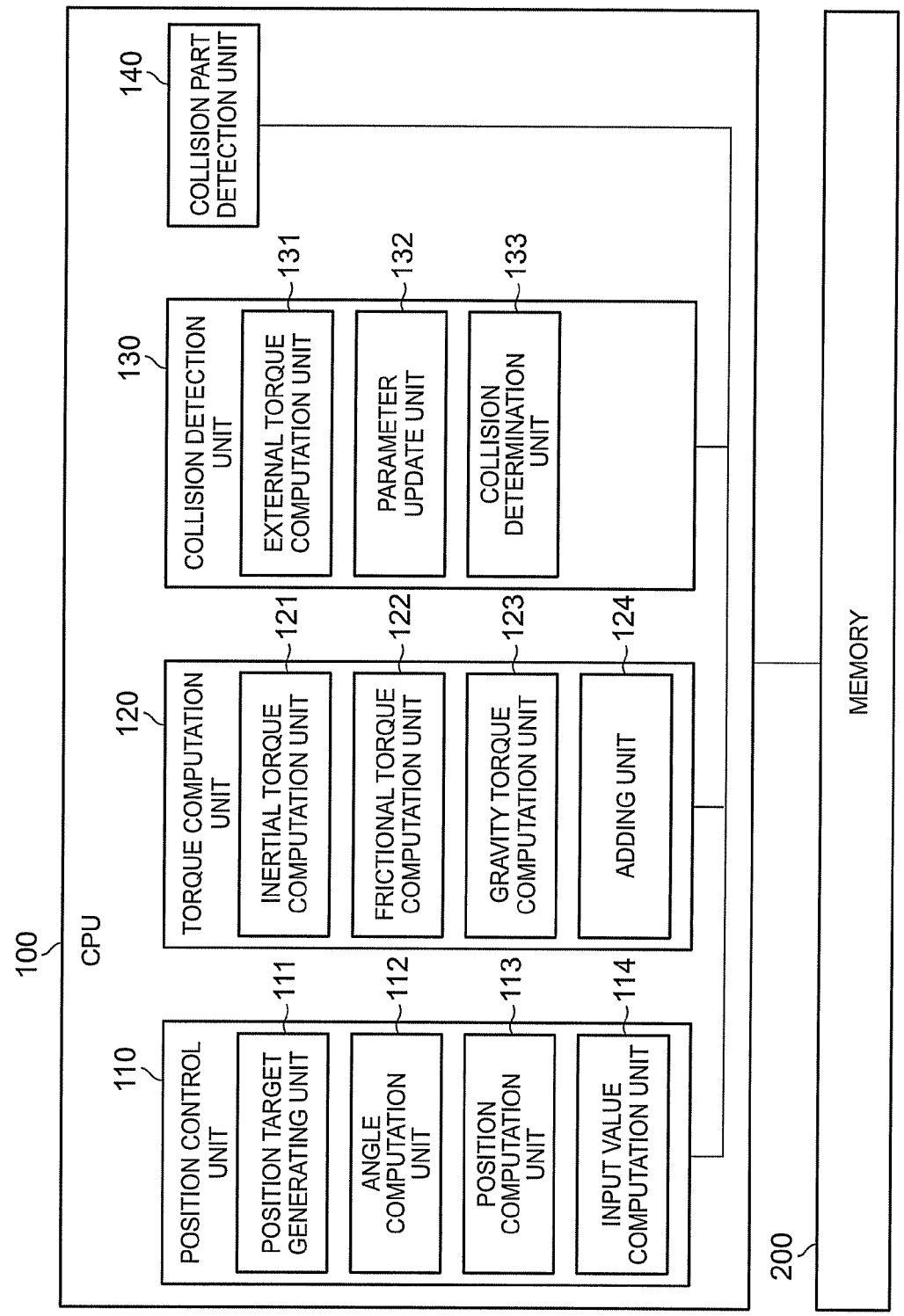
FIG. 11 is a configuration diagram illustrating a robot control apparatus according to a second modification of the first embodiment.

FIG. 11 is a system configuration diagram of the CPU 100 used in the robot control apparatus according to the first modification. In the present modification, in addition to the configuration of FIG. 1, a collision part estimation unit 140 is further provided to estimate where a collision occurs in each link 311 of the arm 310.

The collision detection unit 130 detects a collision in each driving shaft 312 of the arm 310, and the collision part estimation unit 140 estimates that a collision occurs in the link 311 having the driving shaft 312 where a collision is detected.

In the robot control apparatus of at least one of the present embodiments described above, it is possible to detect a disturbance applied to the robot arm with high precision.

Such embodiments are just exemplary and are not intended to limit the scope of the invention. Such embodiments may be embodied in various other forms, various omissions, substitutions, modifications may be made without departing from the gist of the invention. Embodiments and modifications thereof are construed as being included in the scope or gist of the invention and encompassing the invention claimed in appended claims and equivalents thereof.

What is claimed is:

1. A robot control apparatus comprising:
   an actuator for rotatably driving a driving shaft of an arm;
   a generator unit configured to generate target positional data of an end of the arm;
   a first detection unit to detect a rotation angle of the driving shaft at each sampling period;
   a first computation unit configured to compute current positional data of the end of the arm using the rotation angle;
   a second computation unit configured to compute an input value relating to the actuator, by using the target positional data and the current positional data;
   a third computation unit configured to compute an estimation value of a driving torque for driving the actuator using a rotation angle of the driving shaft;
   a fourth computation unit configured to compute a difference between the estimation value of the driving torque and a true value of the driving torque relating to the input value; and
   a second detection unit to detect a disturbance applied to the arm,
   wherein the second detection unit includes
   an update unit configured to estimate a set of parameter of a time-series model by setting the difference as a variable and updating the time-series model of the first sampling period by applying the set of the parameter, and
   a determination unit configured to determine whether or not a disturbance occurs in the arm, by comparing the time-series model of the first sampling period with a time-series model of a second sampling period preceding the first sampling period.

2. The robot control apparatus according to claim 1, further comprising:
   a storage to store a threshold for detecting the disturbance,
   wherein the determination unit determines whether or not a disturbance occurs in the arm by comparing a change amount of the parameter of the time-series model with the threshold.

3. The robot control apparatus according to claim 1, further comprising:
   a storage to store a threshold for detecting the disturbance,
   wherein the determination unit computes a multistage prediction error by using the time-series model and said determination unit determines whether or not a disturbance occurs in the arm by comparing a change amount of the prediction error with the threshold.

4. The robot control apparatus according to claim 1, further comprising:
   a storage to store a threshold for detecting the disturbance,
   wherein the determination, unit computes a frequency response by using the time-series model and said determination unit determines whether or not a disturbance occurs in the arm by comparing a change amount of the frequency response with the threshold.

5. The robot control apparatus according to claim 1, wherein the generator unit updates the target positional data for a direction where the arm is stopped with emergency or inversely operated when the second detection unit detects the disturbance.

6. The robot control apparatus according to claim 1, wherein the arm has a plurality of links and a plurality of driving shafts,
   the second detection unit detects the disturbance in each of the driving shafts, and
   said robot control apparatus further includes an estimation unit which estimates that a disturbance is applied to the link having the driving shaft where the disturbance is detected.

7. The robot control apparatus according to claim 1, wherein the driving shaft includes a first shaft serving as a rotational shaft of the actuator and a second shaft connected to the first shaft through a reducer to reduce a rotation number of the first shaft, and the first detection unit detects a rotation angle of the first shaft, and
   wherein the robot control apparatus further includes a fifth computation unit for computing a rotation angle of the second shaft by using the rotation angle of the first shaft at every sampling cycle,
   the first computation unit computes the current positional data of the end of the arm by using the rotation angle of the second shaft, and
   the third computation unit computes the estimation value of the driving torque for driving the actuator by using the second rotation angle.

8. A disturbance determination method in an operational processing unit, comprising:
   computing an external force estimated to be applied to a target object by a computation unit;
   estimating a set of parameter of a time-series model by setting the external force as a variable and updating the time-series model at a first sampling period by applying the parameter by an update unit; and
   determining whether or not the external force is applied to the target object by comparing the time-series model of the first sampling period and a time-series model of a second sampling period preceding the first sampling period by a determination unit.

9. The disturbance determination method according to claim 8, further comprising:
   storing a threshold for detecting the external force by a storage,
   wherein the determination unit determines whether or not the external force adds by comparing a change amount of the parameter of the time-series model with the threshold.

10. The disturbance determination method according to claim 8, further comprising:
    storing a threshold for detecting the external force by a storage,
    wherein the determination unit computes a multistage prediction error by using the time-series model and said determination unit determines whether or not the external force adds by comparing a change amount of the prediction error with the threshold.

11. The disturbance determination method according to claim 8, further comprising:
storing a threshold for detecting the external force by a storage,
wherein the determination unit computes a frequency response by using the time-series model and said determination unit determines whether or not the external force adds by comparing a change amount of the frequency response with the threshold.

12. The disturbance determination method according to claim 8 further comprising:
generating a target positional data for stopping or inversely operating when the external force is added.

13. A method of controlling an actuator for rotatably driving a driving shaft of an arm, comprising:
generating target positional data of an end of the arm, by a generator unit;
detecting a rotation angle of the driving shaft for every sampling period, by a first detection unit;
computing current positional data of the end of the arm using the rotation angle, by a first computation unit;
computing an input value for the actuator using the target positional data and the current positional data, by a second computation unit;
computing an estimation value of a driving torque for driving the actuator using a rotation angle of the driving shaft, by a third computation unit;
computing a difference between an estimation value of the driving torque and a true value of the driving torque relating to the input value, by a fourth computation unit; and
estimating a set of parameter of a time-series model by setting the difference as a variable and updating the time-series model of the first sampling period by applying the set of the parameter, by an update unit; and
determining whether or not a disturbance occurs in the arm by comparing the time-series model of the first sampling period with a time-series model of a second sampling period preceding the first sampling period by a determination unit.

14. The method of controlling the actuator according to claim 13, further comprising:
storing a threshold for detecting the disturbance by a storage,
wherein the determination unit determines whether or not a disturbance occurs in the arm by comparing a change amount of the parameter of the time-series model with the threshold.

15. The method of controlling the actuator according to claim 13, further comprising:
storing a threshold for detecting the disturbance by a storage,
wherein the determination unit computes a multistage prediction error by using the time-series model and said determination unit determines whether or not a disturbance occurs in the arm by comparing a change amount of the prediction error with the threshold.

16. The method of controlling the actuator for rotatably driving a driving shaft of an arm according to claim 13, further comprising:
storing a threshold for detecting the disturbance by a storage,
wherein the determination unit computes a frequency response by using the time-series model and said determination unit determines whether or not a disturbance occurs in the arm by comparing a change amount of the frequency response with the threshold.

17. The method of controlling the actuator according to claim 13,
wherein the generator unit updates the target positional data for a direction where the arm is stopped or inversely operated when the second detection unit detects the disturbance.

18. The method of controlling the actuator according to claim 13 further comprising:
wherein the arm has a plurality of links and a plurality of driving shafts, detecting the disturbance in each of driving shafts,
estimating that a disturbance is applied to the link having the driving shaft where the disturbance is detected by an estimation unit.

19. The method of controlling the actuator according to claim 13,
wherein the driving shaft includes a first shaft serving as a rotational shaft of the actuator and a second shaft connected to the first shaft through a reducer to reduce a rotation number of the first shaft, and the first detection unit detects a rotation angle of the first shaft, and
wherein
a rotation angle of the second shaft by using the rotation angle of the first shaft at every sampling cycle, is computed by a fifth computation unit,
current positional data of the end of the arm by using the rotation angle of the second shaft, is computed by the first computation unit, and
the estimation value of the driving torque for driving the actuator by using the second rotation angle, is computed by the third computation.

* * * * *